(12) United States Patent
Kuppuswamy (10) Patent No.: US 10,422,390 B2
(45) Date of Patent: Sep. 24, 2019

(54) DUAL LAYER SINTERED METALLIC CLUTCH FRICTION FACING

(71) Applicant: Eaton Corporation, Cleveland, OH (US)

(72) Inventor: Deevakar Kuppuswamy, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 55 days.

(21) Appl. No.: 15/361,715

(22) Filed: Nov. 28, 2016

(65) Prior Publication Data
US 2017/0152899 A1 Jun. 1, 2017

(30) Foreign Application Priority Data
Nov. 27, 2015 (IN) .......................... 3881/DEL/2015

(51) Int. Cl.
| | |
|---|---|
| *F16D 13/68* | (2006.01) |
| *B22F 5/10* | (2006.01) |
| *B22F 7/02* | (2006.01) |
| *F16D 69/00* | (2006.01) |
| *F16D 13/64* | (2006.01) |
| *F16D 69/04* | (2006.01) |

(52) U.S. Cl.
CPC ................ *F16D 13/68* (2013.01); *B22F 5/10* (2013.01); *B22F 7/02* (2013.01); *F16D 69/00* (2013.01); *F16D 2013/642* (2013.01); *F16D 2069/005* (2013.01); *F16D 2069/0458* (2013.01); *F16D 2200/0004* (2013.01); *F16D 2200/0034* (2013.01); *F16D 2200/0065* (2013.01)

(58) Field of Classification Search
CPC ....... F16D 2069/005; F16D 2069/0433; F16D 13/68; F16D 69/02; F16D 69/027; F16D 69/025; F16D 2250/0023; F16D 2250/0061; F16D 2250/0069; B22F 3/16; B22F 7/04; B22F 7/042
See application file for complete search history.

(56) References Cited

U.S. PATENT DOCUMENTS

| | | | | |
|---|---|---|---|---|
| 3,037,860 | A * | 6/1962 | Masterson | .............. F16D 69/02 106/36 |
| 3,367,774 | A * | 2/1968 | Dasse | ........................ B22F 7/00 228/262.4 |

(Continued)

FOREIGN PATENT DOCUMENTS

WO    WO-2015024038 A1 *    2/2015    ............. F16D 13/68

*Primary Examiner* — Jacob S. Scott
*Assistant Examiner* — Lori Wu
(74) *Attorney, Agent, or Firm* — Mei & Mark LLP (57) ABSTRACT

A method for forming a friction facing comprises placing a bonding powder mix in to a die, and placing a performance powder mix in to the die. Pressing the performance powder mix and the bonding powder mix creates a compact. Sintering the compact forms a friction facing. A clutch disc assembly can be formed. A clutch disc can comprise a mounting hole for securing a friction facing and a backer plate can comprise a pass-through hole. A mounting mechanism joins the mounting hole to the pass-through hole. The mounting mechanism comprises a head-height for a portion of the mounting mechanism that is mounted near the sintered compact. The bonding layer comprises a thickness corresponding to the head-height of the mounting mechanism.

16 Claims, 7 Drawing Sheets

(56) References Cited

U.S. PATENT DOCUMENTS

| | | | | |
|---|---|---|---|---|
| 4,050,619 | A | * | 9/1977 | Tarr ........................ F16D 69/02 |
| | | | | 228/162 |
| 4,871,394 | A | * | 10/1989 | Baker ................... B22F 1/0003 |
| | | | | 419/11 |
| 6,610,244 | B2 | | 8/2003 | Dollmeier et al. |
| 6,610,245 | B2 | | 8/2003 | Kanaoka |
| 2016/0195143 | A1 | * | 7/2016 | Muehlegger ............ F16D 13/68 |
| | | | | 192/107 R |

* cited by examiner

DUAL LAYER SINTERED METALLIC CLUTCH FRICTION FACING

FIELD

This application relates to clutch disc friction facings and methods for forming the facing.

BACKGROUND

Clutches can use discs having a friction facing. By pressing the friction facing against another surface, the disc provides a gripping function. The friction facings can be made of a material that wears over time due to the gripping and friction applied to the disc. The material can be expensive.

SUMMARY

The methods and devices disclosed herein overcome the above disadvantages and improves the art by way of a method for forming a friction facing, comprising placing a bonding powder mix in to a die, and placing a performance powder mix in to the die. Pressing the performance powder mix and the bonding powder mix creates a compact. Sintering the compact forms a friction facing.

A friction facing for a clutch disc comprises a bonding layer which omits copper, bronze, zirconium, and other friction modifiers and a performance layer which comprises copper, bronze, zirconium, and other friction modifiers.

A friction facing for a clutch disc comprises a bonding layer which can have more or less of the binding materials than the performance layer.

A clutch disc assembly comprises a mounting mechanism to secure a backing plate sintered together to the bonding layer of a dual layer friction facing to the core disc. The height of the bonding layer is comparable to the height of the coupling material used to secure the backing plate to the disc. The bonding layer height ranges from one-third to one-half of the total width of the dual friction facing.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures and are not intended to limit the orientation of the disclosed devices and methods during use.

Figures 1A, 1B:
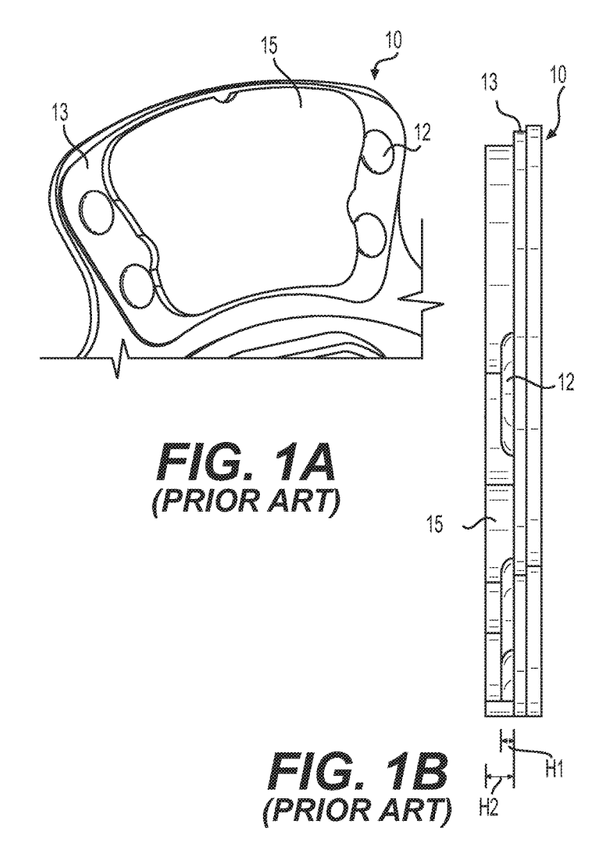
FIGS. 1A and 1B are views of a prior art disc.

In the prior art of FIGS. 1A and 1B, a friction facing 15 on a disc assembly 10 is shown as a uniform layer. The facing has a total height H2 from the backer plate 13 that is coupled to the disc 10 through a rivet 12. An unusable thickness occurs because the rivet 12 protrudes on the backer plate 13 to height H1.

Figure 2A:
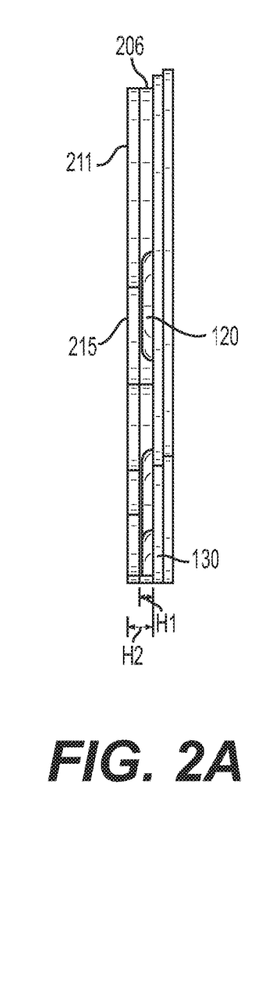
FIGS. 2A and 2B are views of a dual layer facing disc.
Figure 2B:
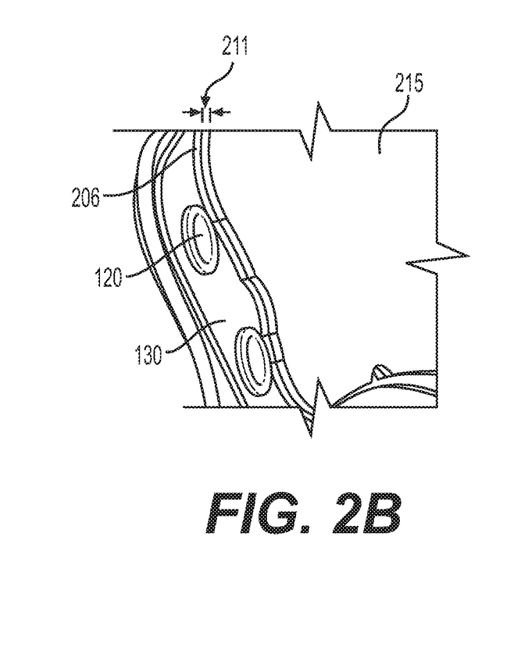

In FIGS. 2A and 2B, a dual layer friction facing 215 on a disc assembly 200 is shown. The facing 215 has a first layer 206 attached to a front surface of a backer plate 130. The first layer 206 has a height of H1. The first layer 206 and second layer 211 have a combined height of H2. H2 is the total height of the friction facing 215. The second layer 211 has a height of H2 minus H1 equal to H3. The usable life of the friction facing is complete when substantially all of the second layer 211 has worn off due to losses during gripping. The backer plate 130 is mounted to the core plate of the disc assembly 200 by use of a rivet 120. The rivet 120 is an example of a mounting mechanism. Other mounting mechanisms are solder, bolts and screws, or the like. The rivet 120 has a head-height that protrudes from the core plate of the disc assembly 200 and the backer plate 130. H1, the height of the first layer 206, is comparable to the resulting head-height from the protruding rivet 120.

Figure 1C:
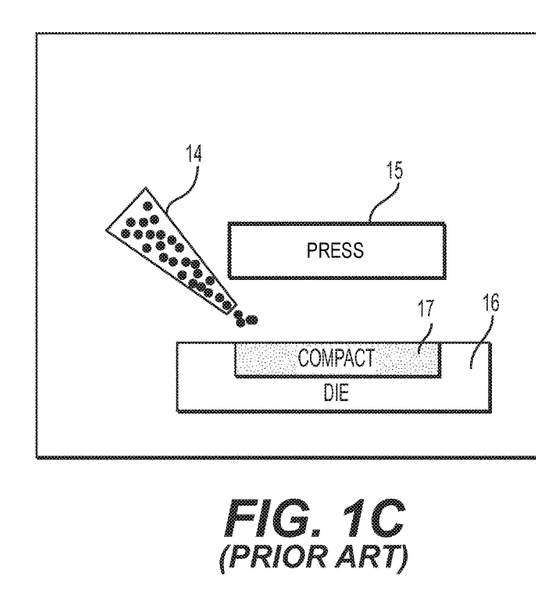
FIG. 1C is a view of a prior art disc processing method.

In the prior art process of FIG. 1C, a friction facing is assembled in a die 16. The compact 17 of friction facing material is formed by putting a powder mixture 14 in to the die 16 and pressing the powder mixture using a pressing mechanism 15. Sintering the compact 17 adheres the powder together to form the friction facing 15. This technique forms a single layer friction facing 15 with homogenous mix throughout the entire thickness.

Figure 2C:
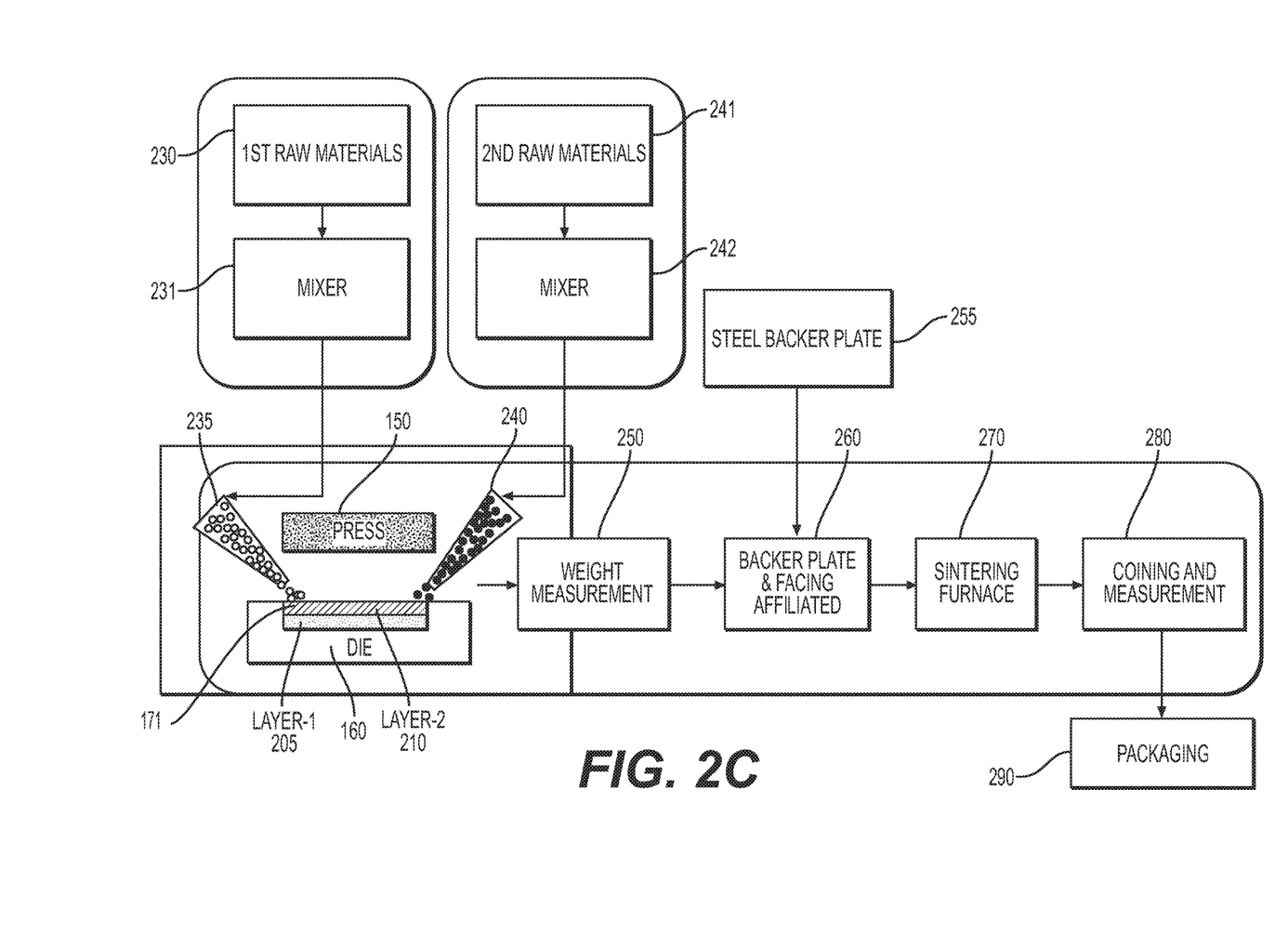
FIGS. 2C and 2D are views of dual layer facing forming techniques.

In FIG. 2C a dual layer ceramic technique is shown to form a dual layer compact 171 with a bonding layer 205 and performance layer 210. The die 160 receives a first layer of a bonding mix 235 that is processed through a raw material holding container 230 and then a mixer 231. The bonding mix 235 can omit or reduce expensive materials such as copper, bronze, zirconium, and certain other friction modifiers since it does not need to provide grip. So, materials that augment grip can be omitted. Instead, the bonding mix 235 can include materials that augment the adhesion of the friction facing to the disc 200. The disc 200 can comprise a backing plate 130, and the bonding layer 205 can be attached to the backing plate 130.

A performance mix 240 is applied over the bonding mix 235 to form the required height H2 for the friction facing 215. The performance mix 240 can also have a holding container 241 and mixer 242. The dual layers formed by the bonding layer 205 and performance layer 210 can create the requisite "button" or "compact" 171 for forming a friction facing 215 for a friction disc. The performance mix 240 can comprise expensive materials such as copper, bronze, zirconium, and certain other friction modifiers in a greater quantity than the bonding layer. This maintains the superior performance of the friction facing 215 while reducing costs.

The dual layer ceramic technique places the powder mix 235 for the bonding layer 205 in to the die 160 and then places the powder mix 240 for performance layer 210 in to the die 160. A leveling step can smooth the bonding layer prior to applying the performance layer, and a second levelling step can smooth the performance layer prior to pressing. Levelling can compromise scraping with a blade, or other mechanical devices and techniques. A press 150 is used to create a dual layer compact 171. A weight measurement device 250 can be used to ensure that the correct amount of material has been included in the compact. Weight measurement can occur after pressing to form the compact or during of intermittently during the addition of the powder mixes 235, 240 and brazing or other material addition from sprayer 209. Weight measurement can be done during or after the addition of each the powder mixes, brazing material or other material applications to check whether additional material is needed, or to check whether there is too much material.

If the compact meets specifications for weight, a backer plate is introduced. As one example, a steel backer plate 255 is shown, though other backer plated can be used. For example, a copper-plated backer plate can be used. The backer plate 255 and compact are put together utilizing devices for backer plate and facing affiliation 260. Sintering in sintering furnace 270 adheres the materials in to a friction facing 215 with a final bonding layer 206 and final performance layer 211. Post-processing steps and devices can include a coining device and measurement device 280. The coining and measurement device can comprise separate or integrated devices. When the friction facing meets post-sintering specifications, it is sent to packaging equipment 290 for packaging. Packaging can comprise assembly in to a clutch device or aftermarket friction facing packaging.

By maintaining the ratio of the thickness of the two layers of materials prior to compact press, it is possible to ensure that the bonding layer mix 235 does not come out during the sintering process. The ratio of bonding layer to performance layer can be maintained, in part, by having two separate powder mix inputs from mixers 231 and 242 respectively.

The above dual layer ceramic technique and resulting device can be used in many applications, including in dry clutches.

Figure 5:
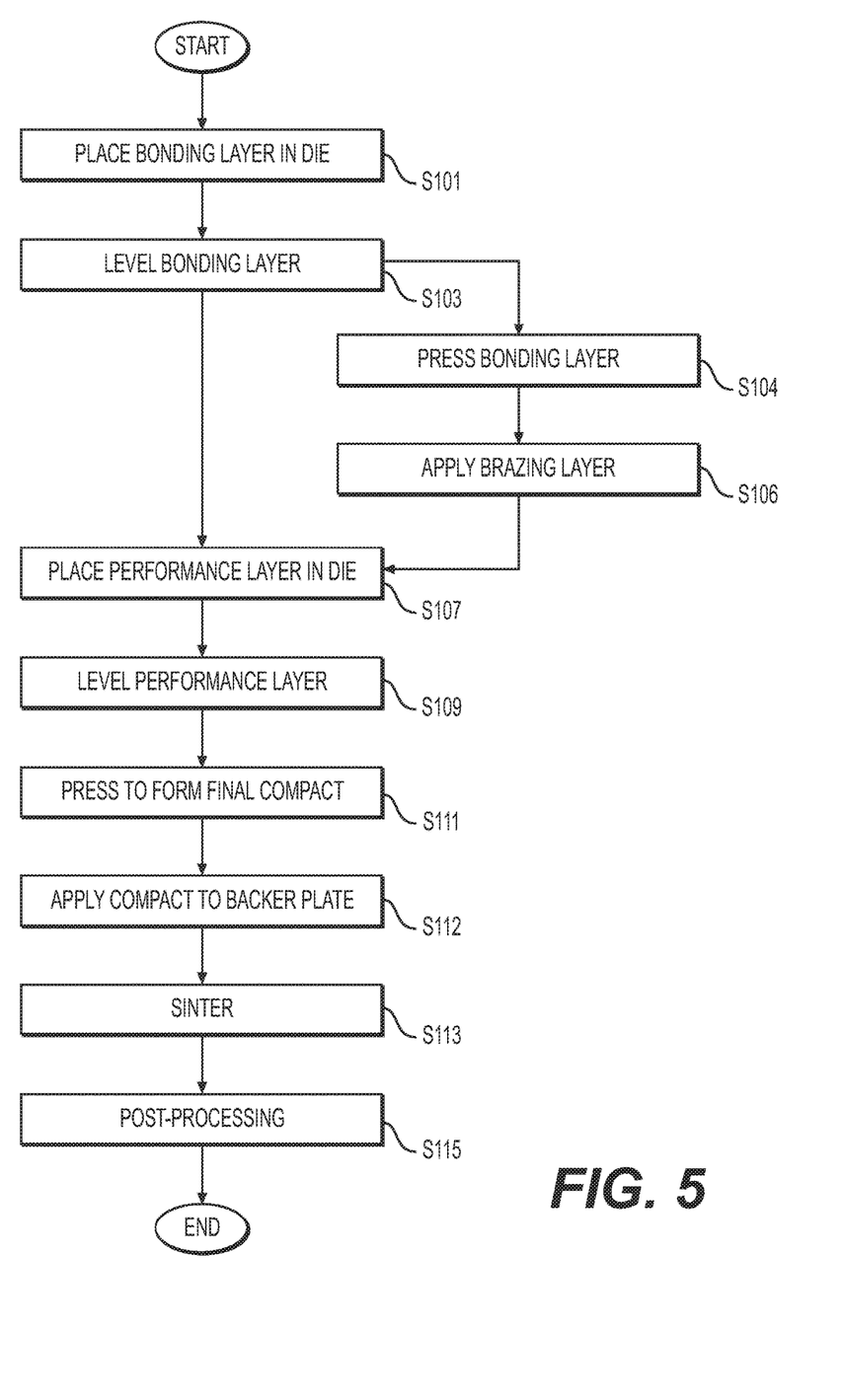
FIG. 5 is a step flow diagram of a dual layer facing forming method.

FIG. 5 outlines a method for forming a dual layer sintered facing through a step flow diagram comprising of steps S101-S115. At process start-up, a die can be chosen to receive a powder mix of the desired materials for a bonding layer in step S101. A leveling step S103 is performed to smooth the bonding layer prior to applying the performance layer in step 107, and a second levelling step S109 can smooth the performance layer prior to pressing in step S111. Levelling can compromise scraping with a blade, or other mechanical devices and techniques. The two layers are then pressed to form a final compact on step S111. This compact can be applied to a desired backer plate in step S112 and then processed to be sintered together in step 113. In step S115, a variety of post-processing activities such as coining, pressing, grinding, shot blasting, and measurements can be performed.

A variant of the dual layer sintered facing method in the step flow diagram of FIG. 5 is shown by adding a pressing step S104 after leveling the bonding layer in step S103. Then, a brazing layer is applied over the bonding layer in step S106 prior to placing the performance powder mix in step 107 in to the die.

Figure 2D:
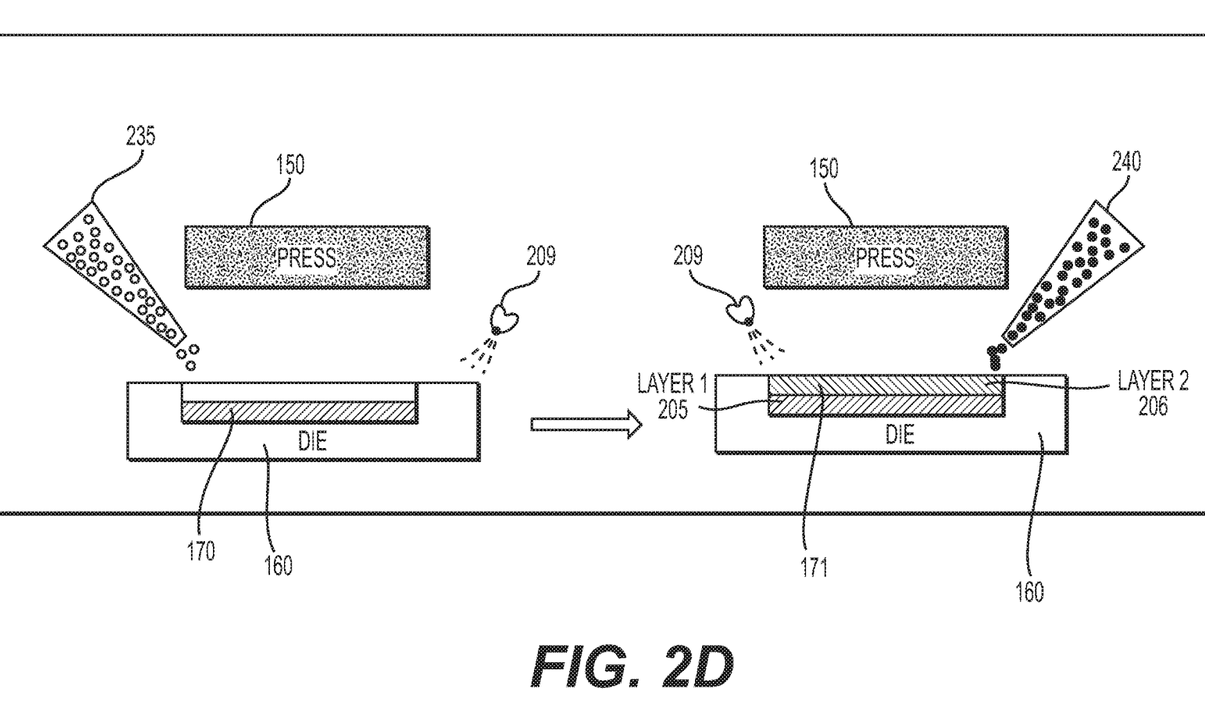

Turning to FIG. 2D, the dual layer friction facing technique can include a brazing layer application. A brazing mechanism, such as sprayer 209, can be used to apply a brazing material to the bonding layer. The brazing material can be a power, or, as illustrated, a sprayed liquid. The brazing material can be applied to the pressed single layer compact 170, which is illustrated as the bonding layer, prior to adding a performance powder mix 240 in the die 160. A dual layer compact 171 is formed by pressing the performance powder mix to form the performance layer.

Depending on the required attributes of the final friction facing material, and depending on the desired order of layer application, a die 160 can be chosen to form the single layer compact 170 and then the dual layer compact 171. In one aspect, the performance powder mix can be added to the die first. Pressing or leveling can occur to form performance layer. Then, the bonding powder mix can be applied, with or without intervening brazing layer application from sprayer 209. Or, as drawn, the bonding layer can be formed in the die prior to applying the performance layer. Thus, the dual layer compact 171 can be formed from either the bonding mix 235 or performance mix 240 being placed one on top of the other and pressed before being sintered.

The disclosed techniques to form a dual layer friction facing can be streamlined to meet the final requirements of a dry clutch assembly. For this purpose, it is possible to place the final dual layer compact 171 as shown in FIG. 2D over a backer plate 130 and sintering the backer plate 130 together with the dual layer facing.

The value of the dual layer friction facing technique is in the resulting facing material 215 that has both the bonding layer 206 with materials to augment adhesive properties to attach to another surface and using less of the expensive friction modifiers, while also maintaining the high performance gripping function through its performance layer 211. The bonding mix 235 can have iron, fillers, and materials to achieve proper binding with both the performance layer 211 on one end and the backer plate 130 or core plate 200 on the other. The performance mix 240 can have higher copper, bronze, zirconium or other related materials to meet the performance requirements such as coefficient of friction and wear necessary for the friction facing surface. Both powder mixes can have materials required for proper binding strength and dimensional stability between the two layers. Some non limiting examples of the types of materials and percentage of material ranges for the bonding and performance mix are shown in the table below. Other percentages can be used based on the intended application of the friction facing.

| Material | Bonding Layer | Performance layer |
| --- | --- | --- |
| Copper | 15-20% | 65-70% |
| Iron | 45-50% | 4-5% |
| Tin | 3-5% | 1-3% |
| Graphite | 5-7% | 5-7.5% |
| Zironium | 9-11% | 10-12% |
| Quartz (SiO2) | 1-2% | 0.1-.25% |
| Silicon Carbide | 5% | — |
| Others (Al O2, Kyanite, Mullite, Cristobalite) | — | 2% |

A friction facing for a clutch disc can be formed from the dual layer sintered facing techniques disclosed. It is possible to have a friction facing material 215 with a bonding layer 206 with less of the expensive friction modifiers such as copper, bronze, and zirconium than the performance layer 211. Similarly, by tailoring the composition of the powder mixes, the bonding layer 206 of the friction facing 215 can have either more or less of the binding materials as compared to the performance layer 211. It is also possible to have a friction facing 215 formed by having a brazing layer between the bonding layer and the performance layer prior to both being pressed together as shown in FIG. 2D. An additional layer of material can be applied over the performance layer 211, and can be the same brazing material or a different performance material applied by a sprayer 209. The material applied to the performance layer can be of a type that permeates the performance layer during the sintering process. A dual layer friction facing can also have a first bonding layer with height H1 which can range from one-third to one-half of the total height H2, H2 being the distance from one end of the bonding layer to the opposite end of the performance layer.

Figure 3A:
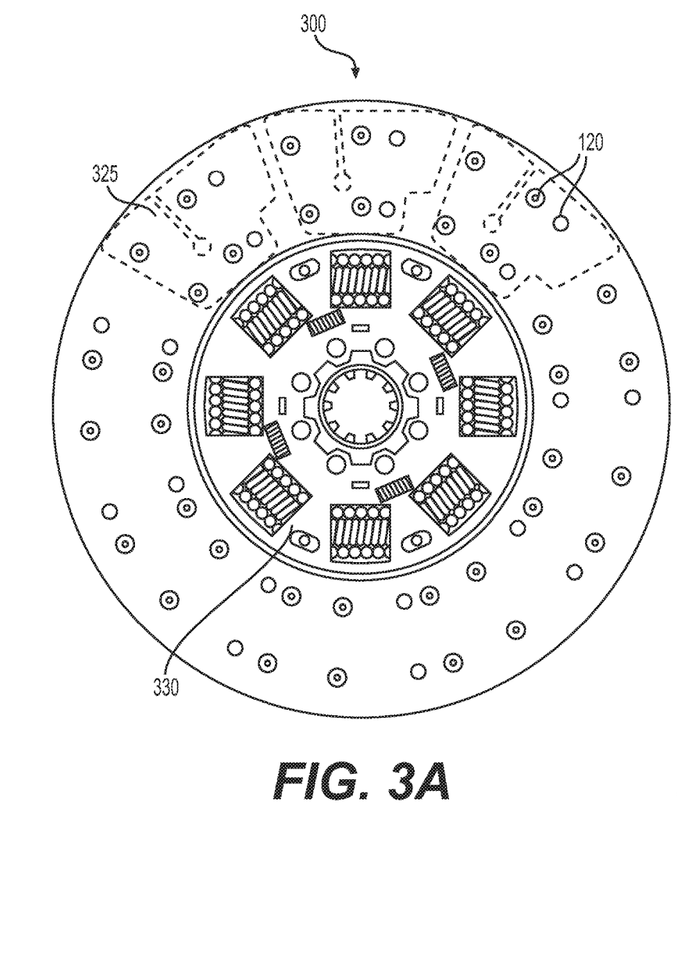
FIGS. 3A-3C are views of a full-faced cushioned friction disc.
Figures 3B, 3C:
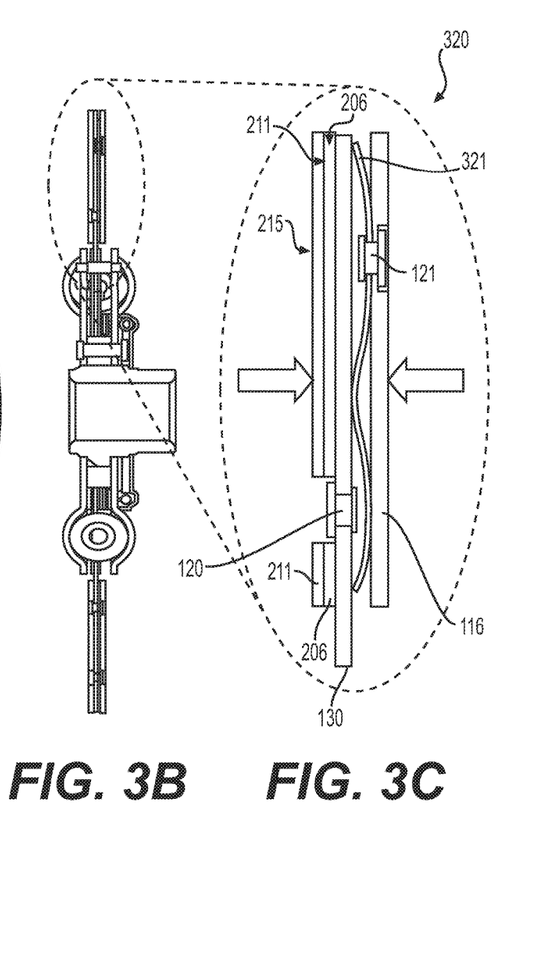

A single disc clutch or a dual disc clutch can benefit from the friction materials disclosed herein. The friction discs can be puck-style as shown in FIG. 2A or full-facing style. FIG. 3A shows a full-facing cushioned friction disc assembly 300. By modifying the die 160 used to form the compact, a full-facing friction material can be formed. Or, a pattern 325 of compacts can be assembled in to a full-facing friction disc assembly 300. The cushioned friction disc assembly may comprise a ceramic material on a first side 215, and an organic material on a second side 116 as shown in FIGS. 3B and 3C. A cushion assembly 321 can be assembled between the first side and the second side. The cushion assembly can comprise mounting mechanisms such as 120 and 121. The height H1 of the bonding layer can be chosen based on the height of the mounting mechanisms, and the height and content of the performance layer can be chosen based on the intended usable life of the friction disc or based on the performance requirements.

A cushion assembly disc can take advantage of a dual layer friction facing as disclosed herein in FIG. 3C to have a friction facing 215 with a first bonding layer 206 and a second performance layer 211. A bonding layer 206 can have a height comparable to the head-height resulting from the protruding mounting mechanism 120.

Figure 4:
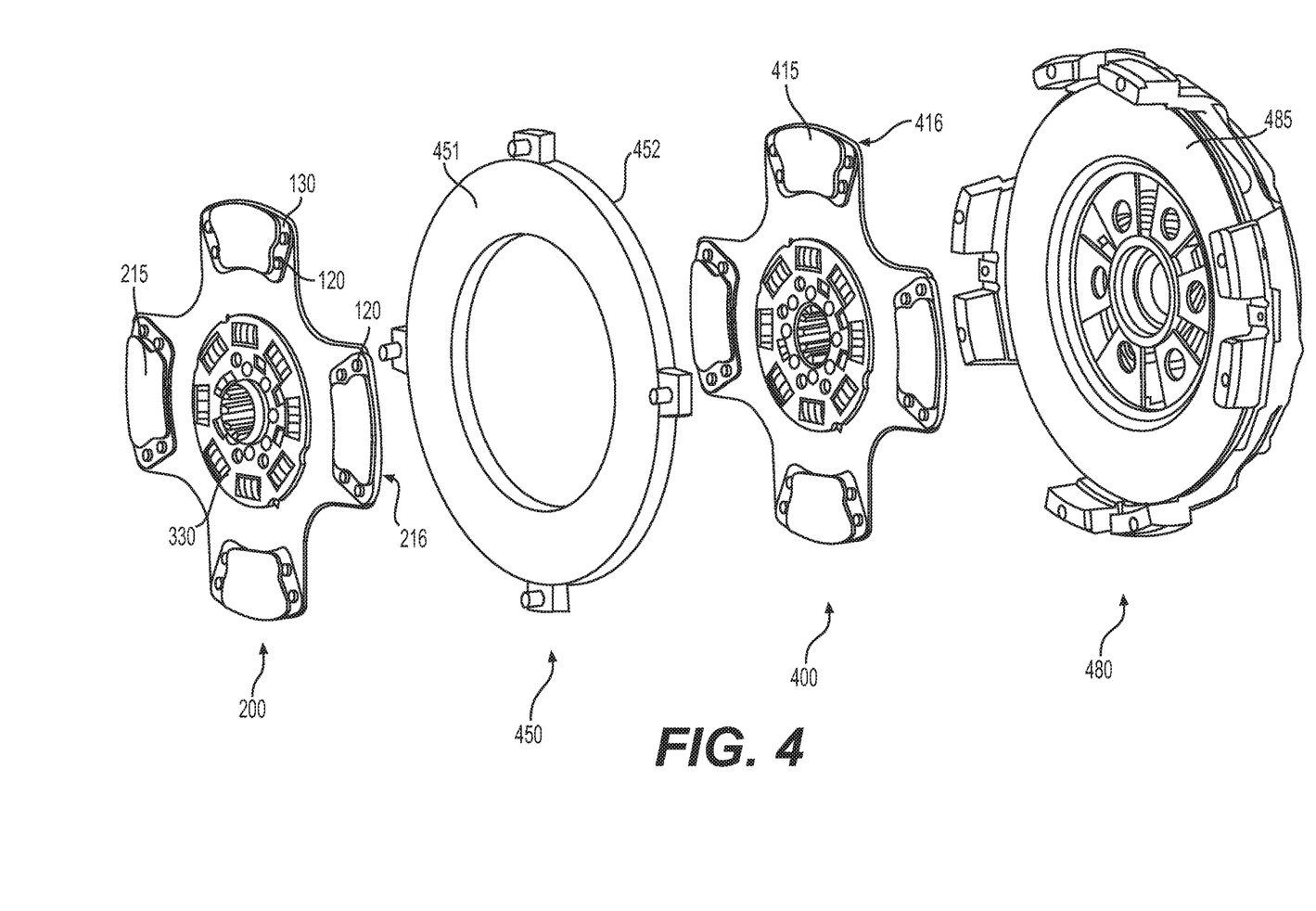
FIG. 4 is an exploded view of a clutch disc assembly.

A clutch disc assembly can be part of the clutch systems to transfer torque from an engine to a transmission or another driveline component. FIG. 4 shows a 2-disc clutch assembly with a front disc 200, an intermediate disk 450, a rear disc 400, and a cover assembly 480. A left plane of the front disc can of be coupled to a flywheel of an engine to rotate. A right plane of the clutch cover 480 can be oriented towards the transmission, and can connect to mechanisms, such as a release bearing assembly or like device, to engage and disengage the clutch components. The clutch can be a push or pull type, and can comprise other actuators, such as a catapult linkage, a concentric actuator, an electric actuator, mechanical rod, hydraulic system, or the like. The clutch can be adjustable or wear through, and can comprise a variety of clutch friction discs. The discs can vary in spline size, facing type, number of facings, cushion rate, damper rate, damper assembly 330, facing material and can optionally comprise pre-damper mechanisms, among other variables. A center axis A can be surrounded by an input shaft for coupling to the transmission. A hub and other customary clutch components can be arranged for torque transfer and to couple to the clutch friction discs and damper mechanisms.

Turning to FIG. 4, the friction material can be assembled in to a clutch assembly having a puck-style. The number of pucks can vary from the four illustrated to a number of pucks. Typically, from 3 to 6 pucks are used, though other numbers may be used based on application, such as 8 or 12.

Friction disc 200 can comprise a friction material 215 configured to engage with the flywheel when the clutch is engaged. A rear friction material 216 is configured to grip a first side 451 of the intermediate plate 450. A friction material 415 of a second friction disc 400 is configured to grip a second side 452 of the intermediate plate 450. A rear side 416 of the second friction disc 400 is configured to grip a pressure plate 485. The pressure plate 485 is actuated by any one of a number of actuators. The pressure plate 485 can move to compress the first friction disc 200, intermediate plate 450, and second friction disc 400 together and towards the flywheel. When compressed, torque is transferred from the flywheel to a central hub, and from the central hub to the transmission or another driveline component.

The clutch disc assembly example in FIG. 4 shows puck-style front and rear discs with friction facing materials that are attached to backing plates 130 and connected to the disc surface 200 or 400 through a mounting mechanism 120. It is noted that a dual layer friction material can be formed under the disclosed method herein by using a die 160 tailored to meet the geometry of the discs 200 and 400. A dual layer compact 171 formed by pressing the bonding mix layer 205 and performance mix layer 210 can be placed such that the bonding layer meets the surface of the backer plate 130 prior to being sintered together. The height H1 of the sintered bonding layer 206 atop the backer plate 130 can be chosen to correspond to the height of the protruding mounting mechanism 120. This height H1 can also be around one-third to one-half of the total height H2 of the sintered dual layer friction material 215.

It is possible that a clutch disk with the dual layer friction facing material 215 has the performance layer 211 with friction modifiers from one or more of copper, bronze, and zirconium. Similarly, it is possible to use the dual layer sintered method disclosed to configure the materials in the bonding layer mix and the performance layer mix where one has more or less of the binding materials that the other.

In the preceding specification, various aspects of the methods and devices disclosed herein have been described with reference to the accompanying drawings. Other implementations will be apparent to those skilled in the art from consideration of the specification and practice of the examples disclosed herein. It is intended that the specification and examples be considered as exemplary only, with the true scope of the invention being indicated by the following claims.

What is claimed is:

1. A method for forming a friction facing, comprising:
    placing a bonding powder mix in to a die to form a bonding layer;
    leveling the bonding layer prior to pressing;
    placing a performance powder mix in to the die to form a performance layer, the performance powder mix comprising a different composition than the bonding powder mix;
    leveling the performance powder mix prior to pressing;
    pressing the performance powder mix and the bonding powder mix to create a dual-layer compact;
    applying the compact to a backer plate; and
    sintering the compact to the backer plate.

2. The method of claim 1, further comprising pressing the bonding powder mix prior to placing the performance powder mix in to the die.

3. The method of claim 2, further comprising applying a brazing layer to the pressed bonding powder mix prior to placing the performance powder mix in to the die.

4. The method of claim 1, wherein the pressing comprises a first pressing step and a second pressing step, wherein the first pressing step forms a first compact layer, wherein the second pressing step forms a final compact by adding a second compact layer to the first compact layer, and wherein one of the bonding layer and the performance layer is the first compact layer and the other of the bonding layer and the performance layer is the second compact layer.

5. The method of claim 1, wherein the bonding powder mix differs in composition from the performance powder mix by comprising less friction modifiers than the performance powder mix.

6. A friction facing for a clutch disc, comprising:
a sintered compact comprising a bonding layer and a performance layer that have been pressed together prior to being sintered together; and
a brazing layer between the bonding layer and the performance layer, wherein the brazing layer is applied prior to pressing together the bonding layer and the performance layer,
wherein the bonding layer differs from the performance layer by comprising less friction modifiers than the performance layer, and
wherein the friction modifiers comprise one or more of copper, bronze, and zirconium.

7. The friction facing of claim 6, wherein the bonding layer differs from the performance layer by comprising less binding material than the performance layer.

8. The friction facing of claim 6, wherein the bonding layer differs from the performance layer by comprising more binding material than the performance layer.

9. The friction facing of claim 6, wherein the bonding layer comprises a thickness that is one third to one half of a total thickness of the sintered compact.

10. The friction facing of claim 9, wherein the performance layer comprises a performance thickness corresponding to a wear-through height.

11. A clutch disc assembly, comprising:
a clutch disc comprising a mounting hole for securing a friction facing;
a backer plate comprising a pass-through hole; and
a compact sintered to the backer plate, the compact comprising a bonding layer and a performance layer that have been pressed together prior to the compact being sintered to the backer plate,
wherein the bonding layer differs from the performance layer by comprising less binding material than the performance layer,
wherein the performance layer differs from the bonding layer by comprising more friction modifiers than the bonding layer, and
wherein the bonding layer is in contact with the backer plate.

12. The clutch disc assembly of claim 11, further comprising a mounting mechanism joining the mounting hole to the pass-through hole, wherein the mounting mechanism comprises a head-height for a portion of the mounting mechanism that is mounted near the sintered compact, and wherein the bonding layer comprises a thickness corresponding to the head-height of the mounting mechanism.

13. The clutch disc assembly of claim 11, wherein the bonding layer comprises a thickness that is one third to one half of a total thickness of the sintered compact.

14. The clutch disc assembly of claim 11, wherein the friction modifiers comprise one or more of copper, bronze, and zirconium.

15. A method for forming a friction facing, comprising:
placing a first mix in a die to form a first layer, the first mix comprising one of a bonding powder mix and a performance powder mix, the performance powder mix comprising a different composition than the bonding powder mix;
pressing the first mix prior to placing a second mix into the die;
placing the second mix in to the die to form a second layer, the second mix comprising the other of the one of the performance powder mix and the bonding powder mix;
pressing the performance powder mix and the bonding powder mix to create a dual-layer compact;
applying the dual-layer compact to a backer plate; and
sintering the dual-layer compact to the backer plate.

16. The method of claim 15, further comprising applying a brazing layer to the pressed first mix prior to placing the second mix in to the die.

* * * * *